(12) United States Patent
Hafner et al.

(10) Patent No.: US 6,311,718 B1
(45) Date of Patent: Nov. 6, 2001

(54) ACTIVATOR VALVE FOR PROVIDING A TIMED VACUUM AT AN OUTPUT PORT

(75) Inventors: V. Walter Hafner, Whittier; Ron Hahn, Yorba Linda; Enrique P. Loreto, Fullerton, all of CA (US)

(73) Assignee: Acorn Engineering Co., City of Industry, CA (US)

( * ) Notice: Subject to any disclaimer, the term of this patent is extended or adjusted under 35 U.S.C. 154(b) by 0 days.

(21) Appl. No.: 09/611,075

(22) Filed: Jul. 6, 2000

(51) Int. Cl.[7] .................................................. F04F 3/00
(52) U.S. Cl. ............................ 137/205; 137/907; 251/29
(58) Field of Search ................................ 137/205, 907; 251/29

(56) References Cited

U.S. PATENT DOCUMENTS 4,373,838 * 2/1983 Foreman et al. ............. 137/236.1 X

* cited by examiner

Primary Examiner—Gerald A. Michalsky
(74) Attorney, Agent, or Firm—Edgar W. Averill, Jr.

(57) ABSTRACT

An activator valve for providing a time temporary vacuum at an output port which is normally at atmospheric pressure. The timed vacuum is provided in response to an increase in air pressure in an interruptible vacuum chamber, such as that by briefly opening the valve between the outside of the valve and the interruptible vacuum chamber. When this pressure increases, a diaphragm holding a magnet moves downwardly attracting a ferro-magnetic disk upwardly. The ferro-magnetic disk opens a valve between the output port and a main vacuum source port. This causes a vacuum to be drawn at the output port, which in turn operates a remote device which the activator valve is controlling. When the source of outside air to the interruptible vacuum chamber is closed the outside air is then drawn from the interruptible vacuum chamber, causing the magnet to once again rise and release the ferro-magnetic member, closing the valve between the main source of vacuum and the output port. The output port then returns to atmospheric pressure ceasing the operation of the remotely controlled device.

18 Claims, 6 Drawing Sheets

ACTIVATOR VALVE FOR PROVIDING A TIMED VACUUM AT AN OUTPUT PORT

BACKGROUND OF THE INVENTION

The field of the invention is pneumatic control valves and the invention relates more particularly to valves which provide a timed vacuum at an output port in response to an external force.

A valve which has many of these characteristics are shown in U.S. Pat. No. 4,373,838. A diaphragm in the middle of the first chamber moves when the vacuum on one side of the diaphragm is released by movement of a sensor diaphragm as the result of a small increase in pressure on one side of the sensor diaphragm. This increase in pressure on one side of the sensor diaphragm causes a slotted shaft to move laterally permitting the vacuum to be drawn on an output port. A needle valve draws a vacuum on one side of the first chamber returning the diaphragm to its original position and moving the slotted stem to its original closed configuration. This returns the output port to atmospheric pressure.

BRIEF SUMMARY OF THE INVENTION

It is an object of the present invention to provide an activator valve which subjects an output port to a timed temporary vacuum in response to an external force. The external force may be a slight increase in pressure in a chamber or may be the manually pressing of a button.

The present invention is for an activator valve providing a timed temporary vacuum in an output port which output port is normally at atmospheric pressure. The valve has an interruptible vacuum chamber connected to an activator passageway. The interruptible vacuum chamber is connected to a vacuum source conduit through a restricted orifice. The vacuum source conduit is connected to a vacuum source port. The interruptible vacuum chamber has a magnet supporting member sealingly and movably held by biasing means in a normally raised position sealing a floor of said interruptible vacuum chamber. Said magnet supporting member has a magnet held thereby. A magnet draw-down chamber has said magnet supporting member over an upper end thereof. Said magnet draw-down chamber is connected to a vacuum source by a magnet draw-down chamber vacuum source conduit and said magnet draw-down chamber has a rigid floor. An upper valve activation chamber is sealed from said magnet draw-down chamber by said rigid floor. The upper valve activation chamber contains a ferro-magnetic member and said ferro-magnetic member is movable between a raised position and a lowered position and is normally oriented in a lowered position. A valve activation member is operably moved by the movement of said ferro-magnetic member. A lower valve activation chamber is positioned below said ferro-magnetic member and is connected to a controlled source of atmospheric air. The valve activation member is operably connected to a main vacuum valve which, when in a closed position, seals a main vacuum source port from said lower valve activation chamber. When the main vacuum valve is opened by the attraction and upward movement of the ferro-magnetic member and its controlled valve activation member, the main vacuum source port is connected to said lower valve activation chamber. The output port of the valve is also connected to at least one of the upper and lower valve activation chambers, whereby when said activator passageway is open and is then closed, the pressure in said interruptible vacuum chamber increases, moving the magnet down and thereby lifting the ferro-magnetic member and opening the main vacuum valve. After the activator passageway is closed, a vacuum again begins to be drawn in the interruptible vacuum chamber through the restricted orifice in the timed manner and when the vacuum reaches a sufficient level, the magnet supporting member rises, thereby raising the magnet and releasing its attraction of the ferro-magnetic member, thereby closing the main vacuum valve, and returning the outport to atmospheric pressure. Preferably, the restricted orifice is adjustable in size, such as by a needle valve. The activator passageway may be opened by an air pressure operated valve or can be manually operated by utilizing a stand pipe in a sump and connecting the stand pipe to a closed chamber above a flexible diaphragm. The diaphragm may be caused to bow downwardly when the pressure in the stand pipe increases as the result of the increase in liquid level. If the air pressure operated valve is connected to a lever moved by the downward bowing of the diaphragm, the increased pressure in the stand pipe will operate the air pressure operated valve, thereby triggering a vacuum at the output port.

DESCRIPTION OF THE PREFERRED EMBODIMENTS

Figure 1A:
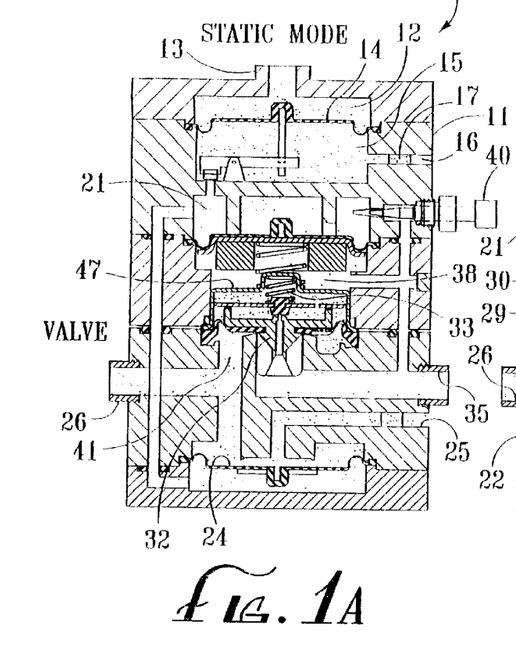
FIG. 1A is a diagrammatic cross-sectional view of the activator valve of the present invention in a static mode.
Figure 1B:
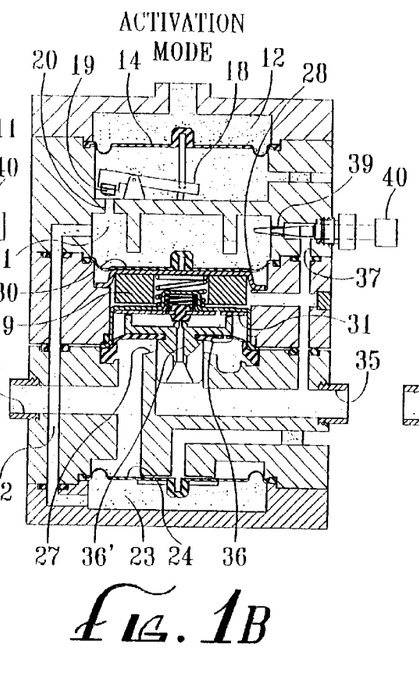
FIG. 1B is a diagrammatic cross-sectional view thereof in an activation mode.
Figure 1C:
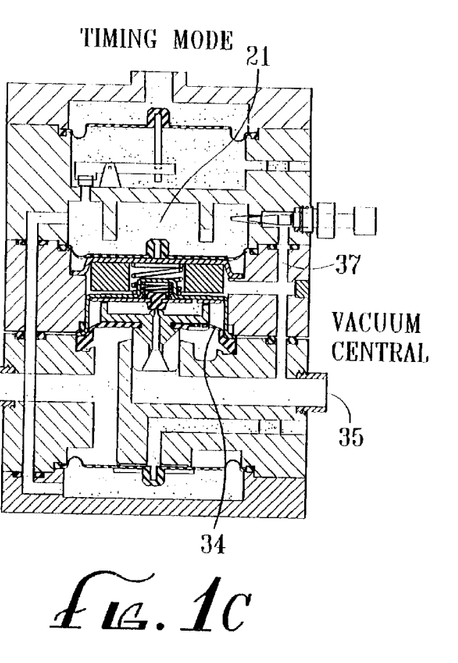
FIG. 1C is a diagrammatic cross-sectional view thereof in a timing mode.

The activator valve of the present invention is shown in a diagrammatic cross-sectional view in FIG. 1A in a static mode and indicated generally by reference character 10. Activator valve 10 has a valve body 11 which contains a number of chambers. The uppermost chamber in FIGS. 1A, 1B, and 1C is a pressure change chamber 12. Pressure change chamber 12 has an input port 13 which may be connected to a stand pipe as diagrammatically shown in FIG. 7 of the drawings. There are numerous other sources of pressure change which also may be connected to input port 13, such as a bulb which, when squeezed, would increase the pressure through the input port. At the bottom of the pressure change chamber 12 is an activator valve diaphragm 14 which forms a flexible seal between pressure change chamber 12 and atmospheric pressure chamber 15. Chamber 15 is connected to the atmosphere through air conduit 16 and filter 17.

When the pressure in pressure change chamber 12 increases as shown in FIG. 1B, activator valve diaphragm 14 deflects downwardly which moves lever 18, thereby lifting activator passageway valve 19. This opens activator passageway 20, allowing air to enter interruptible vacuum chamber 21, which is normally in a state of vacuum as shown in FIG. 1A. A vertical conduit 22 leads to bottom chamber 23, which increases the pressure therein, causing atmospheric inlet control diaphragm 24 to rise from its position shown in FIG. 1A to that shown in FIG. 1B. When diaphragm 24 is in its lower position as shown in FIG. 1A, lower air conduit 25 has a free passageway through a controlled source of atmospheric air to output port 26. Output port 26 is connected to the device controlled by valve 10. Typically, the device to be controlled would not operate when output port 26 is at atmospheric pressure as shown in FIG. 1A and would open or otherwise move when output port 26 is subjected to vacuum as shown in FIG. 1B.

The vacuum in output port 26 is created by the opening of main vacuum orifice 27 as described below. As the pressure in interruptible vacuum chamber 21 increases, a magnet diaphragm 28 bows downwardly as shown in FIG. 1B. A magnet 29 is affixed to a magnet supporting member 30, which in turn is affixed to magnet diaphragm 28. Thus, as the pressure increases above magnet diaphragm 28, magnet 29 lowers and attracts a ferro-magnetic disk 31, lifting it as shown in FIG. 1B. Ferro-magnetic disk 31 is normally held downwardly, as shown in FIG. 1A, by the force of spring 33. Ferro-magnetic disk urges valve activation member 32 downwardly, which in turn seals valve activation diaphragm 34 against main vacuum orifice 27. Thus, as shown in FIG. 1A, although a vacuum is imposed at main vacuum source port 35, it cannot pass through vacuum orifice 27 when in the lowered position of FIG. 1A. However, when spring 33 is compressed by the raising of ferro-magnetic disk 31 as shown in FIG. 1B, valve activation diaphragm 34 is released from contact with main vacuum valve 27 and a vacuum is immediately imposed at output port 26. This movement of valve activation member 32 is assisted by the release of pressure above valve activation diaphragm 34 by the lifting of elastic valve 36 above a central port 36' in valve activation member 32. This lifting exists between FIGS. 1A and 1B and is not shown in the drawings since it is a very momentary lifting, but does assist in the raising of valve activation diaphragm 34 from main vacuum orifice 27.

Next, the valve goes into a timing mode shown in FIG. 1C. In this mode, vacuum imposed at main vacuum source port 35 travels through vacuum source conduit 37. Vacuum source conduit 37 also leads to magnet draw-down chamber 38. A restricted orifice 39 is controlled in size by needle valve 40 and in a timed manner, draws the air which has entered through activator passageway 20 into interruptible vacuum chamber 21 out through vacuum source conduit 37. As the vacuum increases in interruptible vacuum chamber 21, magnet diaphragm 28 rises to a position shown in FIG. 1A, thereby releasing ferro-magnetic disk 31 to the position shown in FIG. 1A. This once again closes main vacuum orifice 27. Thus, as needle valve 40 is opened, the vacuum is pulled more rapidly from interruptible vacuum chamber 21 and more quickly allows the magnet to rise, closing the vacuum on outlet port 26.

Figure 2A:
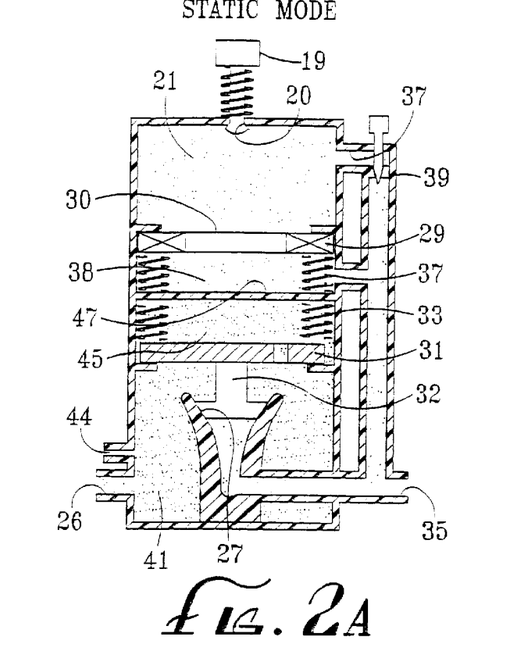
FIG. 2A is a diagrammatic cross-sectional view of a simplified form of a manually operated activator valve of the present invention in a static mode.
Figure 2B:
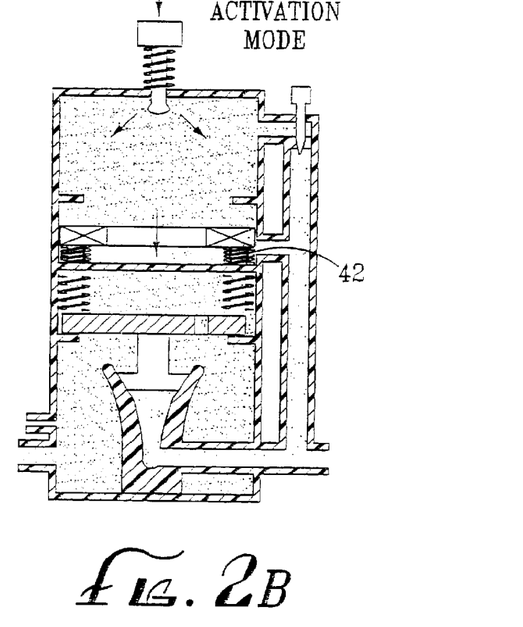
FIG. 2B is a diagrammatic cross-sectional view of the valve of FIG. 2A in an activation mode.
Figure 2C:
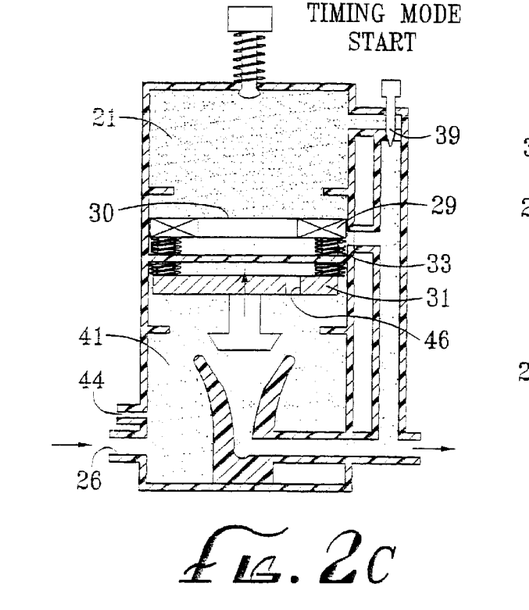
FIG. 2C is a diagrammatic cross-sectional view of the valve of FIG. 2A in a timing mode.
Figure 2D:
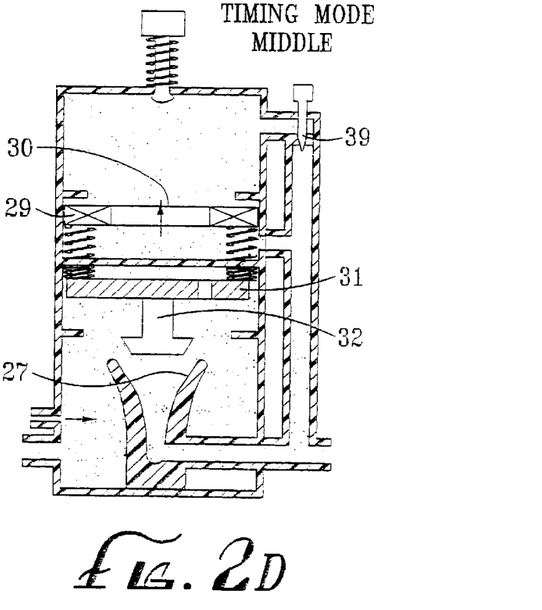
FIG. 2D is a diagrammatic cross-sectional view of the valve of FIG. 2A in the middle of the timing mode.

Further details of construction of the valve are set forth below in a discussion of FIGS. 3 and 4. However, a short discussion of the basic elements of the activator valve of the present invention may be appreciated by a study of FIGS. 2A, 2B, 2C and 2D. Valve 10 has a push button valve 19 which temporarily activator passageway 20 when manually depressed. This permits air to enter interruptible vacuum chamber 21 as shown by comparing FIG. 2A with 2B. By increasing the pressure in interruptible vacuum chamber 21, magnet support member, which is slidingly and sealingly affixed at the base of chamber 21, moves downwardly as shown in FIG. 2B. This causes magnet 29 to attract ferro-magnetic member 31 upwardly as shown in FIG. 2C. Ferro-magnetic member 31 is affixed to valve activation member 32 which lifts away from the main vacuum valve 27, causing the vacuum to form from vacuum source port 35 into lower orifice activation chamber 41, as shown in FIG. 2C. This causes a vacuum to be drawn at output port 26 controlling the remote device which the activator valve is intended to control. Since valve 19 is closed in FIG. 2C, vacuum is drawn through restricted orifice 39 from interruptible vacuum chamber 29. This permits springs 42 to push magnet supporting member 30 and magnet 29 up and away from ferro-magnetic member 31. Once the distance between magnet 29 and ferro-magnetic disk 31 is sufficient, springs 33 push ferro-magnetic member 31 downwardly so that valve activation member 32 moves downwardly, closing main vacuum orifice 27, thereby causing the valve to return to the status shown in FIG. 2A. In order to provide a source of atmospheric air to lower valve activation chamber 41, a restricted air inlet 44 is provided. The space above ferro-magnetic member 31 is referred to as an upper valve activation chamber 45 which is maintained at the same pressure as lower valve activation chamber 41 by passageway 46. A rigid floor 47 exists between magnet draw-down chamber 38 and upper valve activation chamber 45. Rigid floor 47 is also shown in FIGS. 1A through 1C.

Figure 3:
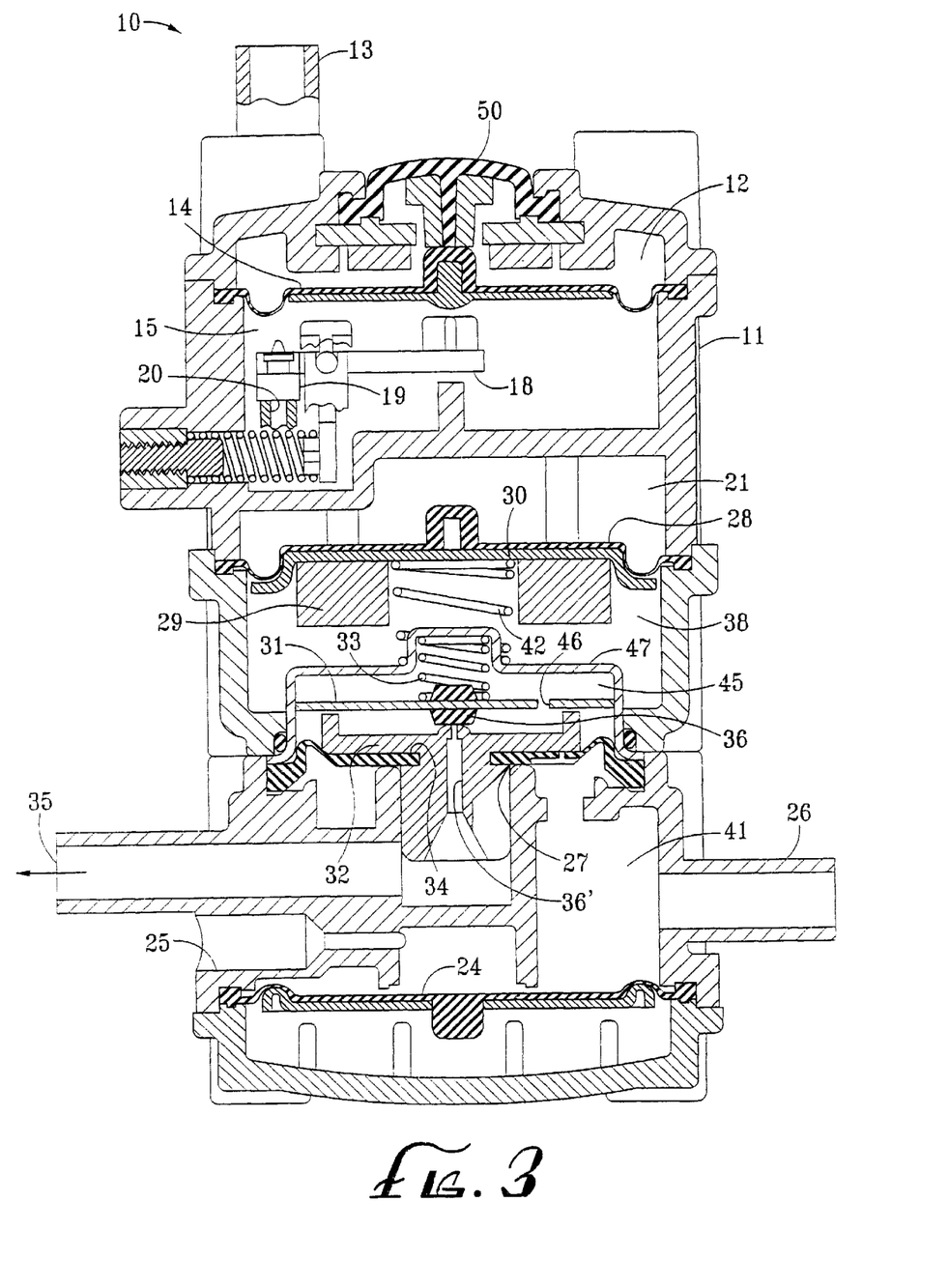
FIG. 3 is detailed cross-sectional view of an operating valve analogous to that shown in FIG. 1A.
Figure 4:
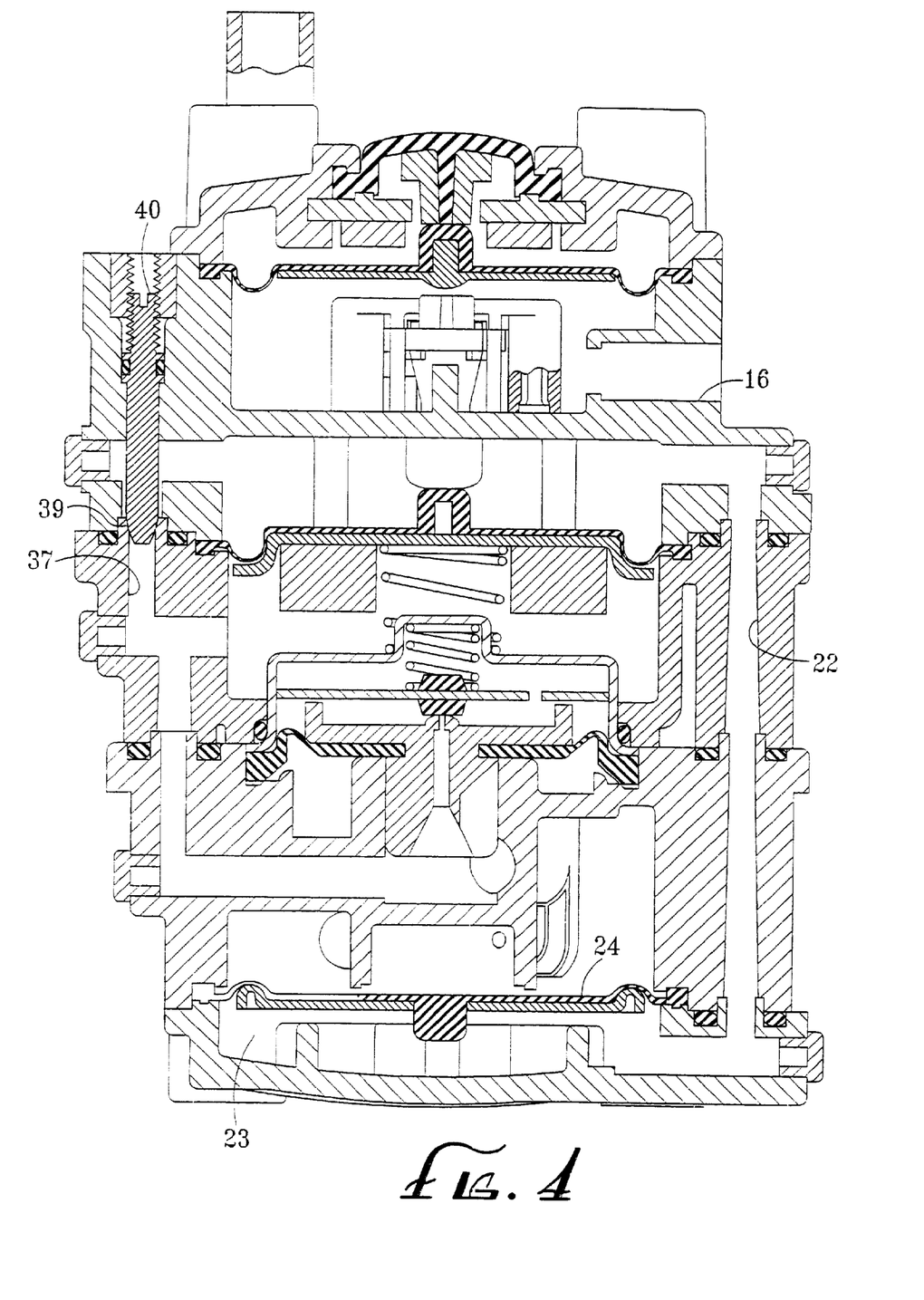
FIG. 4 is a cross-sectional view of the valve of FIG. 3 taken along a vertical central axis at 90° to that shown in FIG. 3.
Figure 5:
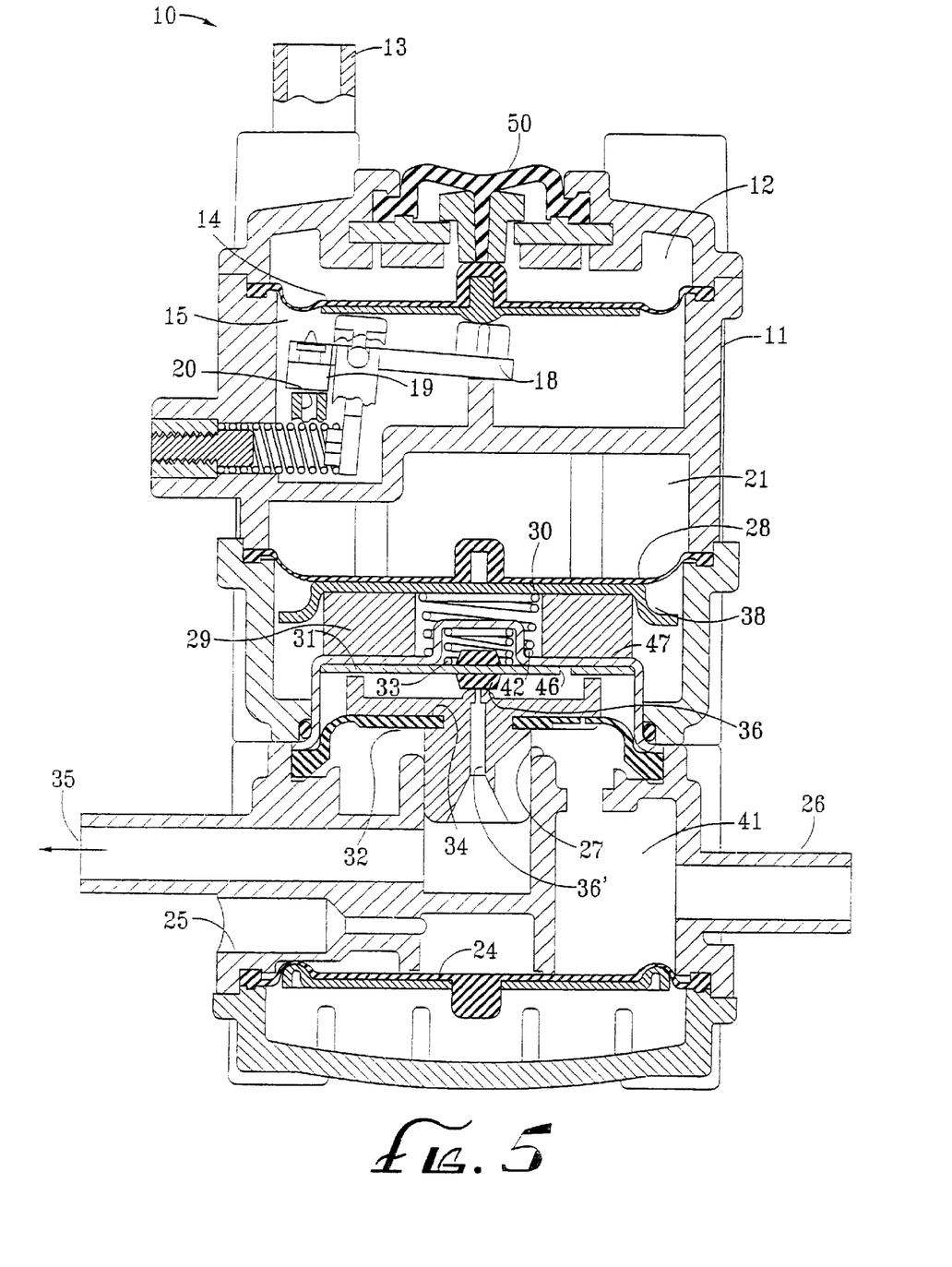
FIG. 5 is a cross-sectional view analogous to FIG. 3, except showing the push button depressed and in an activation mode.

A practical operating activator valve is shown in FIGS. 3 and 4 of the drawings. FIG. 4 is shown at a 90° angle with respect to FIG. 3. The operation of the valve of FIGS. 3 and 4 is as follows. As pressure is slightly increased at input port 13, activator valve diaphragm 14 moves downwardly to contact lever 18 as shown in FIG. 5. This lifts valve 19 and opening activator passageway 20. Alternatively, as shown in FIG. 5, push button 50 may be depressed manually, which also deflects activator valve diaphragm 14 in the same manner as increased pressure in pressure change chamber 12 does. Since atmospheric pressure chamber 15 contains air under atmospheric pressure, the opening of activator passageway 21 causes air to flow into interruptible vacuum chamber 21. This deforms magnet diaphragm 28 downwardly, causing magnet 29 to move downwardly against the upward force of spring 42. Spring 42 is supported at its lower end on rigid floor 47, between magnet draw-down chamber 38 and upper valve activation chamber 45. As magnet 29 moves downwardly, ferro-magnetic member is attracted upwardly, which withdraws elastic valve 36 from central port 36'. This causes vacuum to pass from main vacuum source port 35 into upper valve activation chamber 45. This eliminates pressure differential at vacuum orifice valve 27 which pressure differential normally keeps vacuum orifice valve 27 closed. Ferro-magnetic member spring 33 biases the ferro-magnetic member downwardly, as shown in FIGS. 3 and 4. Ferro-magnetic spring 33 is also supported by rigid floor 47. However, when ferro-magnetic member 31 is attracted upwardly against the force of ferro-magnetic spring 33, the pressure differential is eliminated and valve activation diaphragm 34 is permitted to lift together with valve activation member 32, allowing vacuum to be pulled through main vacuum orifice 27, thereby subjecting output port 26 and lower valve activation chamber 41 to a temporary source of vacuum. Under normal conditions, controlled source of atmospheric air 25 passes above atmospheric inlet control diaphragm 24, thereby subjecting output port 26 to atmospheric pressure which is the normal inactive position shown in FIGS. 3 and 4.

Figures 6, 7:
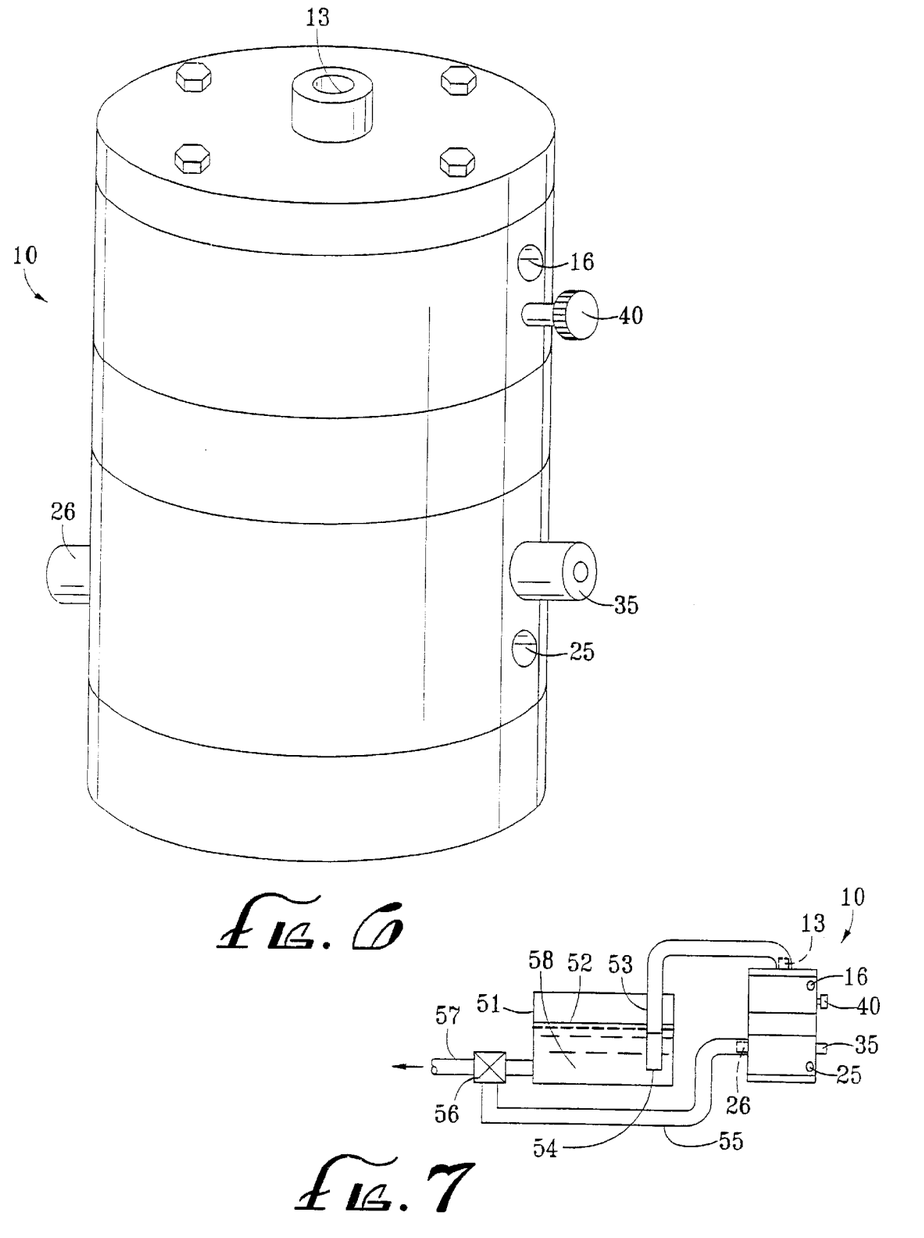
FIG. 6 is an external view of the valve of FIGS. 3 and 4.
FIG. 7 is a diagrammatic view showing possible use of the valve of the present invention.

The exterior of valve 10 is shown in FIG. 6 of the drawings. Input port 13 receives air under slightly increased pressure which causes a vacuum at output port 26 to be imposed. As shown in FIG. 7, a sump contains water having a water level 52. As water level 52 rises, a stand pipe 53, which has opening 54 under water level 52, begins to partially fill with water. This increases the air pressure in stand pipe 53 which passes a slight increase in air pressure into input port 13. This, as described above, causes a vacuum to be imposed at output port 26. This vacuum passes through control line 55 to controlled valve 56. This control valve is connected to vacuum line 57 which draws the water 58 out of sump 51, thereby exposing opening 54 to the atmosphere and converting the pressure in pressure change chamber 12 to atmospheric pressure, closing activator passageway 20 and starting the timing sequence described above. The activator valve of the present invention does not require any electricity and operates in a maintenance-free manner for a very large number of cycles.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An activator valve for providing a timed temporary vacuum at an output port which is normally at atmospheric pressure, in response to an increase in air pressure in an interruptible vacuum chamber, said valve having a valve body and said activator valve comprising:

an interruptible vacuum chamber connected to an activator passageway, said interruptible vacuum chamber being connected to a vacuum source conduit through a restricted orifice, said vacuum source conduit being connected to a vacuum source port, said interruptible vacuum chamber having a magnet supporting member sealingly and movably held by biasing means in a normally raised position sealing a floor of said interruptible vacuum chamber and said magnet supporting member having a magnet held thereby;

a magnet draw-down chamber having said magnet supporting member over an upper end thereof and said magnet draw-down chamber being connected to a vacuum source by a magnet draw-down chamber vacuum source conduit and said magnet draw-down chamber having a rigid floor;

an upper valve activation chamber sealed from said magnet draw-down chamber by said rigid floor and said upper valve activation chamber containing a ferro-magnetic member and said ferro-magnetic member being movable between a raised position and a lowered position and being normally oriented in a lowered position when not being raised by said magnet and said ferromagnetic member having a valve activation member operably moved by the movement of said ferro-magnetic member;

a lower valve activation chamber positioned below said ferro-magnetic member, said lower valve activation chamber connected to a controlled source of atmospheric air, said valve activation member being operably connected to a main vacuum orifice which, when in a closed position, seals a main vacuum source port from said lower valve activation chamber but when opened, by the attraction and upward movement of said ferro-magnetic member and its controlled valve activation member, connects said main vacuum source port to said lower valve activation chamber, said output port being connected to at least one of said upper and lower valve activation chambers whereby when said activator passageway is opened and then closed, the pressure in said interruptible vacuum chamber increases and said increased pressure above said magnet supporting member causes said magnet supporting member and said magnet to lower sufficiently close to said ferro-magnetic member to attract said ferro-magnetic member thereby raising the valve activation member and opening said main vacuum orifice thereby reducing pressure in said upper and lower valve activation chambers to provide a vacuum at said output port of said activator valve however since a vacuum source is connected to said interruptible vacuum chamber, through said restricted orifice, the pressure in said interruptible vacuum chamber decreases above said magnet supporting member which rises thereby raising the magnet, releasing its attraction of said ferro-magnetic member which closes said main vacuum orifice thereby shutting off a vacuum source to the output conduit and returning the pressure at the output port to atmospheric pressure through said controlled source of atmospheric air.

2. The activator valve of claim 1 wherein said restricted orifice is adjustable in size.

3. The activator valve of claim 1 wherein said interruptible vacuum chamber and said magnet draw-down chamber are separated by a flexible magnet diaphragm sealed between the interruptible vacuum activation chamber and the magnet draw-down chamber in an airtight manner.

4. The activator valve of claim 3 wherein said magnet supporting member is affixed to said flexible magnet diaphragm.

5. The activator valve of claim 4 wherein said biasing means which hold the magnet supporting member in a normally raised position is a helical spring supported at a lower end by said rigid floor of said magnet draw-down member.

6. The activator valve of claim 1 wherein said ferro-magnetic member is biased toward its lowered position by a helical spring held at an upper end by said rigid floor of said magnet draw-down chamber.

7. The activator valve of claim 1 wherein said activator passageway is opened by a manually operated valve.

8. The activator valve of claim 1 wherein said activator passageway is opened by an air pressure operated valve.

9. The activator valve of claim 8 wherein said air pressure operated valve is moved by the movement of an activator valve diaphragm.

10. The activator valve of claim 9 wherein said activator valve diaphragm has an upper surface exposed to a pressure change chamber and a lower surface exposed to atmospheric pressure.

11. The activator valve of claim 10 wherein said pressure change chamber is connected to a stand pipe having a lower end submersed in a liquid and when a liquid level rises, the liquid rises in the stand pipe increasing the pressure in the stand pipe and the pressure change chamber a slight amount thereby deflecting the activator valve diaphragm downwardly and opening said activator passageway.

12. The activator valve of claim 11 further including a manually adjustable spring biased to oppose the opening of the activator passageway.

13. The activator valve of claim 1 wherein the valve activation member of the main vacuum orifice lifts and lowers a valve activation diaphragm which supports the main vacuum orifice.

14. The activator valve of claim 13 wherein the valve activation diaphragm divides the upper and lower valve activation chambers.

15. The activator valve of claim 14 wherein the valve activation diaphragm has a passageway therethrough near an outer edge thereof.

16. The activator valve of claim 1 wherein said controlled source of atmospheric air is connectable to the lower valve activation chamber through an atmospheric inlet control diaphragm controlling a valve between said lower valve activation chamber and a source of atmospheric air and said atmospheric inlet control diaphragm being positioned between said lower valve activation chamber and a bottom chamber which is connected to said interruptible vacuum chamber.

17. An activator valve for providing a timed temporary vacuum at an output port which is normally at atmospheric pressure, in response to an increase in air pressure in an interruptible vacuum chamber, said valve having a valve body and said activator valve comprising:

an interruptible vacuum chamber connected to an activator passageway, said interruptible vacuum chamber being connected to a vacuum source conduit through a restricted orifice, said vacuum source conduit being connected to a vacuum source port, said interruptible vacuum chamber having a magnet supporting member affixed to a flexible magnet supporting diaphragm sealingly and movably held by biasing means in a normally raised position sealing a floor of said interruptible vacuum chamber and said magnet supporting member having a magnet held thereby;

a magnet draw-down chamber having said magnet supporting member over an upper end thereof and said magnet draw-down chamber being connected to a vacuum source by a magnet draw-down chamber vacuum source conduit and said magnet draw-down chamber having a rigid floor;

an upper valve activation chamber sealed from said magnet draw-down chamber by said rigid floor;

a ferro-magnetic member positioned within said upper valve activation chamber and said ferro-magnetic member being movable between a raised position and a lowered position and being normally oriented in a lowered position by biasing means when not being raised by said magnet and said ferro-magnetic member having a valve activation member operably moved by the movement of said ferro-magnetic member;

a lower valve activation chamber positioned below said ferro-magnetic member, said lower valve activation chamber connected to a controlled source of atmospheric air, said valve activation member being operably connected to a main vacuum orifice which, when in a closed position, seals a main vacuum source port from said lower valve activation chamber but when opened, by the attraction and upward movement of said ferro-magnetic member and its controlled valve activation member, connects said main vacuum source port to said lower valve activation chamber, said output port being connected to at least one of said upper and lower valve activation chambers whereby when said activator passageway is opened and then closed, the pressure in said interruptible vacuum chamber increases and said increased pressure above said magnet supporting member causes said magnet supporting member and said magnet to lower sufficiently close to said ferro-magnetic member to attract said ferro-magnetic member thereby raising the valve activation member and opening said main vacuum orifice thereby reducing pressure in said upper and lower valve activation chambers to provide a vacuum at said output port of said activator valve however since a vacuum source is connected to said interruptible vacuum chamber, through said restricted orifice, the pressure in said interruptible vacuum chamber decreases above said magnet supporting member which rises thereby raising the magnet, releasing its attraction of said ferro-magnetic member which closes said main vacuum orifice thereby shutting off a vacuum source to the output conduit and returning the pressure at the output port to atmospheric pressure through said controlled source of atmospheric air.

18. The activator valve of claim 17 wherein said ferro-magnetic member has an elastomeric valve affixed thereto and when said ferro-magnetic member is in its lowered position said elastomeric valve is seated over a passageway in said valve activation member thereby preventing the passage of air from said upper valve activation chamber into said main vacuum source port but when said ferro-magnetic member is lifted, said elastomeric valve opens said passageway in said valve activation member causing a vacuum to be formed in said upper valve activation chamber causing a valve activation diaphragm to lift away from a valve seat positioned between said main vacuum source port and said lower valve activation chamber thereby imposing a vacuum at said output port.

* * * * *